United States Patent
Cunningham et al.

(10) Patent No.: US 7,148,800 B2
(45) Date of Patent: Dec. 12, 2006

(54) METHOD FOR ASSOCIATING AN ASSET WITH A MONITORING DEVICE

(75) Inventors: James Franklin Cunningham, Schwenksville, PA (US); Torsten Wegner, Exton, PA (US)

(73) Assignee: Transport International Pool, Inc., Wayne, PA (US)

(*) Notice: Subject to any disclaimer, the term of this patent is extended or adjusted under 35 U.S.C. 154(b) by 176 days.

(21) Appl. No.: 10/837,815

(22) Filed: May 3, 2004

(65) Prior Publication Data
US 2005/0242181 A1    Nov. 3, 2005

(51) Int. Cl.
*G08B 1/08* (2006.01)
(52) U.S. Cl. ............................ 340/539.11; 340/426.19; 340/514; 340/531; 340/539.16; 340/539.17; 340/5.92; 342/357.07; 342/357.09; 705/28
(58) Field of Classification Search ............ 340/572.1, 340/572.4, 505, 10.1, 10.4, 10.42, 5.1, 5.92, 340/431, 825.49, 514, 531, 539.1, 539.13, 340/539.16, 539.17, 691.6, 539.22, 426.19; 705/28; 709/217; 235/385; 342/357.06, 342/357.07, 357.09, 457
See application file for complete search history.

(56) References Cited

U.S. PATENT DOCUMENTS

| | | | |
|---|---|---|---|
| 5,959,275 A | 9/1999 | Hughes et al. | |
| 6,104,978 A | 8/2000 | Harrison et al. | |
| 6,204,813 B1 * | 3/2001 | Wadell et al. | 342/463 |
| 6,496,777 B1 | 12/2002 | Tennison et al. | |
| 6,496,806 B1 * | 12/2002 | Horwitz et al. | 705/28 |
| 2001/0000958 A1 | 5/2001 | Ulrich et al. | |
| 2002/0087345 A1 | 7/2002 | Bly et al. | |
| 2002/0111884 A1 | 8/2002 | Groat et al. | |
| 2002/0119770 A1 | 8/2002 | Twitchell | |
| 2003/0101108 A1 | 5/2003 | Botham et al. | |
| 2003/0130912 A1 * | 7/2003 | Davis et al. | 705/28 |

FOREIGN PATENT DOCUMENTS

WO    01/48505 A2    7/2001

* cited by examiner

*Primary Examiner*—Thomas Mullen
(74) *Attorney, Agent, or Firm*—Robert A. Koons, Jr.; Armando A. Flores; Drinker Biddle & Reath LLP

(57) ABSTRACT

A method for establishing an association in a remote computer database between an asset and an electronic device monitoring the asset, while minimizing the chances of an error in the association. The method is capable of being implemented by one user largely automatically. Establishing the association enables reliable remote monitoring of the asset.

35 Claims, 2 Drawing Sheets

METHOD FOR ASSOCIATING AN ASSET WITH A MONITORING DEVICE

FIELD OF THE INVENTION

The invention relates generally to the field of asset monitoring and association. More specifically it relates to establishing an association in a remote database between an asset and an electronic device monitoring the asset.

BACKGROUND OF THE INVENTION

Accurate and timely information on the state or location of numerous physical assets is essential in certain businesses. This often requires constant monitoring of assets, compiling of inventories, and easy storage and retrieval of this information. Innovations such as satellite communication networks and the Global Positioning System (GPS) have enabled automatic remote monitoring of assets.

Remote monitoring of a physical asset can be accomplished with an electronic device associated with the asset and in communication with a remote database. The electronic device may comprise one or more sensors acquiring information about the asset, and a transceiver for transmitting this information to a remote monitoring station and the remote database, as well as receiving commands or information from either remote location.

When many such assets are being monitored simultaneously, each with its own electronic device, one must always know which device is associated with which asset. In many asset-monitoring systems this association is established once and stored in a remote database in a computer. Clearly, it is essential that this association be established accurately and easily. One way this has been done in the past involves the participation of two people—a first person located at the asset and a second person at a database location remote from the asset. The first person at the asset speaks to the second person at the remote location, perhaps over a telephone, and reads out information uniquely identifying the asset and information uniquely identifying the electronic device. The second person then manually enters this information into the remote computer and establishes the association. In this method there are many possibilities for error—the spoken words may be misunderstood or entered incorrectly, and it is difficult to verify the information. The error in association may not be discovered for some time after the association is set up, with undesirable consequences.

Previously disclosed methods and systems for remote asset monitoring do not specifically address the problem of associating assets and monitoring devices while minimizing the chances of error. U.S. Pat. No. 5,959,275 to Hughes et. al. discloses a method for associating circuit cards with storage locations by entering data into a handheld device, but without feedback or validation. U.S. Patent Application Publication US 2003/0101108 A1 to Botham et. al. discloses a method and system for taking, receiving, and reconciling physical inventory data against an asset management database from a remote location. The data to be associated—a serial number and an asset number—are already associated in a barcode on each item. Reconciliation of this data with that in the database is done manually, with no verification. U.S. Pat. No. 6,496,777 to Tennison et. al. discloses a system for collecting and reporting information concerning mobile assets using the GPS, but again does not address the accurate association problem.

There is thus a need for a less error-prone method for quickly establishing and verifying the association.

BRIEF DESCRIPTION OF THE INVENTION

More accurate association could be accomplished by a method in which a single individual person, located at the asset, establishes the association through direct communication with the remote computer containing the database. Where the database contains a list of valid identifiers for the assets and for the electronic devices, the validity of the information entered by the one individual person can be immediately checked before the association is established. It is desirable that at least some of the information concerning the electronic device and the asset be transmitted to the remote location automatically once the electronic device is installed at the asset.

The invention comprises a method for establishing an association in a database between an asset and an electronic device monitoring the asset. The method can be implemented by one individual user through the use of a portable device that might have a display, such as a screen, and a manual input, such as a keyboard. Once the association is established, the asset may be remotely monitored. A technical effect of the establishment of the association is the ability of a person to monitor the asset remotely.

The electronic device is in communication with a remote computer containing a stored database. The remote database initially contains information about the asset, such as an identification number, and information about the electronic device, such as a serial number. However, there is initially no information in the database that associates the asset with the electronic device. The database may initially contain information on many such assets and such devices, but no information associating any one asset with any one device. Using the invention, an individual user can establish these associations.

DETAILED DESCRIPTION OF THE INVENTION

Figure 1:
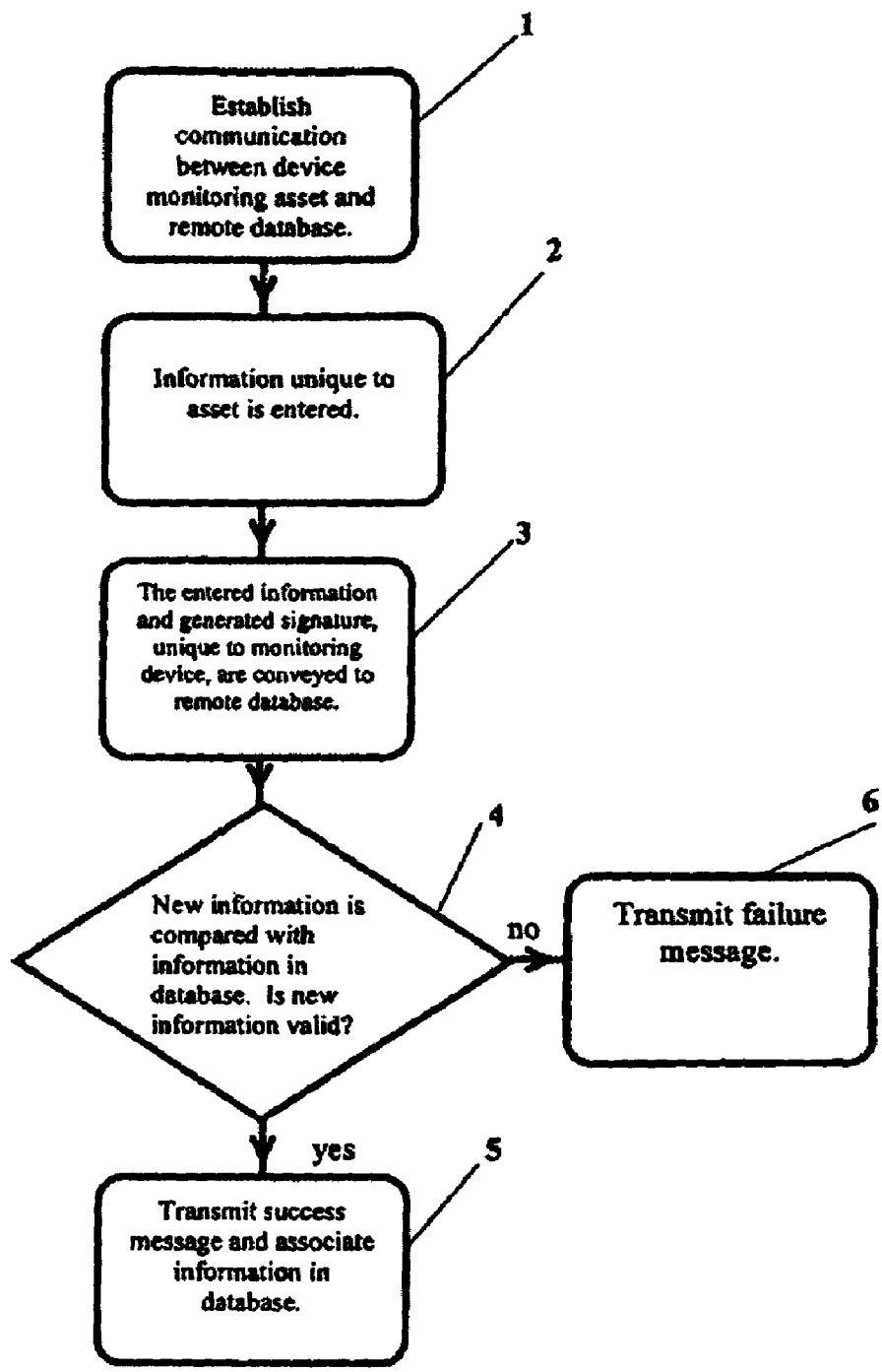
FIG. 1 is a flow chart illustrating the general method.

One embodiment of the method, not to be construed as limiting, is illustrated in the flowchart of FIG. 1. A user installs a monitoring electronic device at the asset and establishes 1 a communication channel between the electronic device and a remote database. The user, using a manual input on a portable device, enters 2 a set of information, at least some of which is unique to the asset, into the electronic device. Alternatively, at least some information in the set may be automatically entered 2. One way this automatic entry could be implemented is through the use of radio frequency RFID (radio frequency identification) tags. The tag would wirelessly transmit the information to the electronic device.

This set of information is conveyed 3 to the remote database via the electronic device. In addition, the electronic device automatically transmits 3 a signature to the remote database, this signature being unique to the electronic device. One example of such signature is a serial number. At least some of this information on the asset and electronic device is automatically compared 4 to information already in the database. If the information being compared matches existing information in the database, the set of information and the signature are automatically associated 5 in the database. The remote computer sends a message back to the user, informing the user of the successful association. If any of the information being compared does not match existing information in the database, the association is not established. The computer sends a message informing the user of the nature of the problem. The message may also provide instructions to the user as to how to remedy the problem, perhaps including a means for returning to a previous information entry step. These messages may be conveyed to the user in many ways including, but not limited to, a display on the portable device or on the electronic device, or text messaging on a cellular telephone 42.

Figure 2:
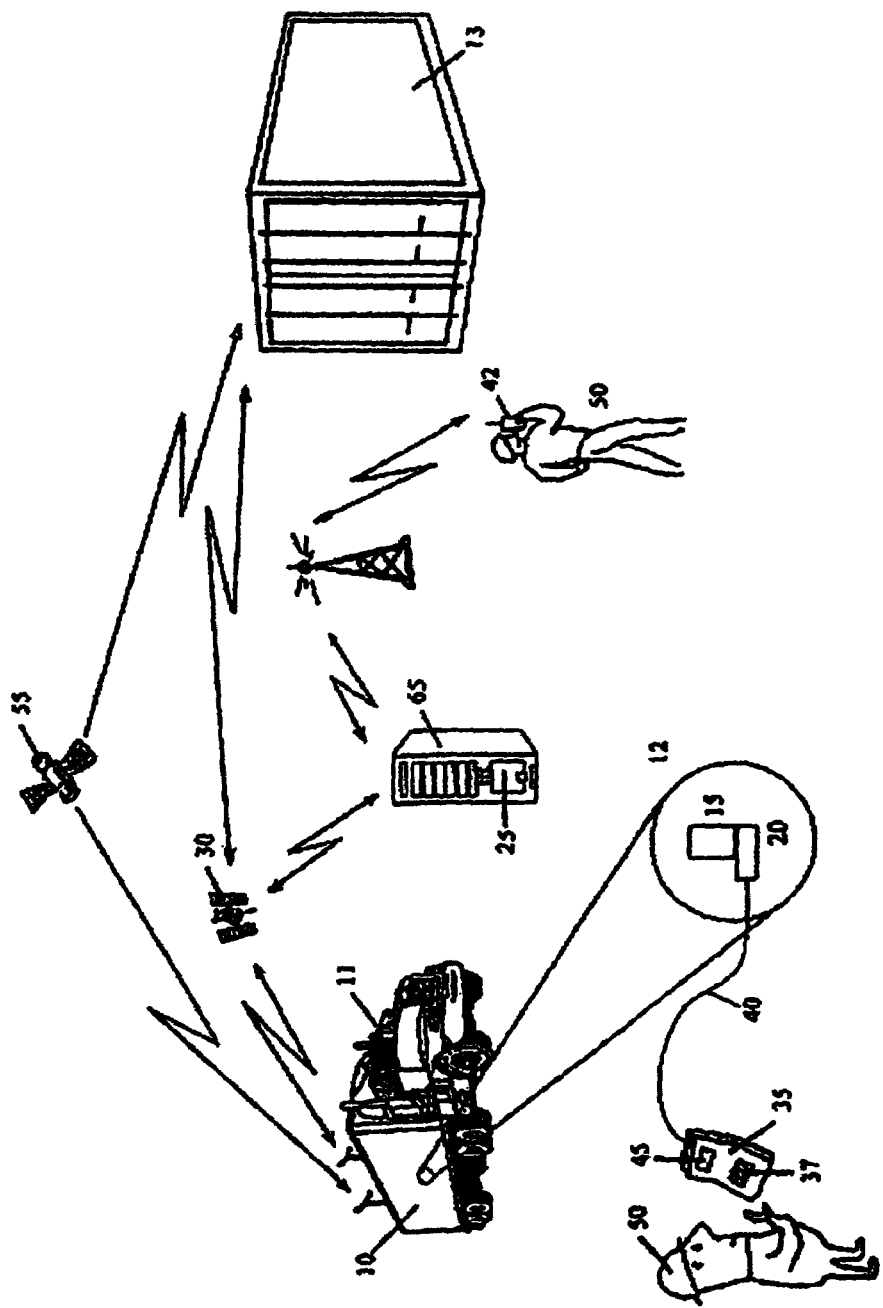
FIG. 2 illustrates one embodiment of the invention, associating a trailer with a GPS locator.

One embodiment of the invention is illustrated in FIG. 2. This embodiment is to be understood as exemplary and not limiting the scope of the invention. In this embodiment the asset is a trailer 10 of the type used to transport or store goods, and what is monitored is the physical location of the trailer 10. An electronic device 12 attached to the trailer 10 is a combination of a Global Positioning System (GPS) receiver 15 and a transceiver 20. The transceiver 20 enables communication with a remote computer 65 through a communications satellite system 30. The computer 65 contains a stored database 25. The GPS receiver 15, when powered, continuously receives and processes signals from the GPS satellites 55, from which the location of the GPS receiver 15 can be determined. Once the GPS receiver is attached to the trailer 10, and the particular GPS receiver 15 is correctly associated with the particular trailer 10 in the database 25, the location of the trailer 10 can be continuously monitored. A technical effect of this embodiment is the ability of a person to continuously monitor the trailer 10.

The association is established by an individual user 50 using a portable handheld electronic device 35 having a screen display 45. The user 50 may enter information manually by using a keyboard 37 on the handheld device 35 or by selecting items in a menu appearing on the display 45. The keyboard 37 could be a physical keyboard 38 or a virtual keyboard 39 appearing on a touch-sensitive screen integrated with the display 45.

The handheld device 35 is connected to the transceiver 20 by a cable 40 that establishes an electronic communication channel between the handheld device and the transceiver. Alternatively, a wireless communication channel could be established using a medium such as radio or infrared light, and a short-range wireless connectivity standard, such as one associated with the trademark BLUETOOTH®. The user 50 may enter some initial information manually into the handheld device 35 before connecting the cable 40. This initial information could include the user's name or other information unique to the user or information unique to the company installing and associating the electronic device with the trailer 10. Once the cable 40 is connected, this initial information may be conveyed to the transceiver 20 and then via the communication satellite system 30 to the database 25. This initial information may be retained through multiple associations of trailers and electronic devices. In particular, this information may be stored for a set period, say 24 hours, then automatically erased. Alternatively, the initial information may be erased at a particular time of day, say midnight, thus making the handheld device ready for use by a different user the following day.

Once the cable 40 is connected, the user 50 may enter additional information unique to the trailer 10 into the handheld device. This information may include identification numbers uniquely identifying the particular trailer 10, such as a Vehicle Identification Number (VIN) or a number assigned by the owner of the trailer 10. The user 50 may then issue a command from the handheld device 35, which results in the manually entered information being transmitted from the handheld device 35 through the cable 40 to the transceiver 20, then through the communication satellite system 30 to the remote database 25. At the same time, the transceiver 20 automatically transmits to the database 25 information in the form of a signature that is unique to the particular combination of transceiver 20 and GPS receiver 15. An example of such a unique signature would be a serial number.

The database 25 initially contains lists of valid information of the type transmitted in this embodiment. For example it may contain lists of valid trailer numbers 60 and valid serial numbers for the electronic device. Once the information for the particular trailer 10 and electronic device 12 is transmitted to the database 25 it is automatically compared to the lists already in the database 25 to check the validity of the incoming information. If the information being compared is found to be invalid for any reason, such as not being present in the lists, being in an incorrect format, typing mistakes by the user 50, a malfunction of any component in the communication channels or electromagnetic interference, a message to that effect is generated by the computer 65 and transmitted back to the display 45. The message may include instructions to the user 50 on how to correct the problem or provide a means, such as a virtual button, for returning to a previous step and re-entering information.

If the information being compared is determined to be valid, an association is automatically established in the database 25 between the information unique to the trailer 10 and the information unique to the electronic device 12. A message is generated by the computer 65 and transmitted back to the display 45 informing the user 50 that the association has been successful. At that point the user 50 may disconnect the cable 40 and handheld device 35 from the transceiver 20, take the handheld device and cable to another trailer equipped with another electronic device and repeat the procedure to establish a new association. Once the association is established, a customer can determine the location of the trailer 10 by reading the GPS location determined by the GPS receiver 15.

Other capabilities may be included in this exemplary embodiment. In addition to the GPS receiver 15, other sensors may be installed on the trailer 10 to monitor other variables and transmit these variables to the display 45 or the remote database 25. Examples of such variables are battery voltages powering the transceiver 20, load-balance, temperature within the trailer 10, a unique identifier for a tractor 11 hooked to the trailer, and whether a door is open or closed. As another capability, once the handheld device 35 is connected to the transceiver by the cable 40 the user could initiate automatic diagnostic tests on the GPS system 15, transceiver 20, the satellite communication 30, or any sensors present, to insure proper operation before beginning the association process. The results of these tests could be presented to the user 50 on the display 45 along with instructions on how to correct any detected problems.

Other embodiments of the invention can be used in many other situations to establish the association needed for remote monitoring. One example, not to be construed as limiting, would be the remote monitoring of the supply of liquid helium necessary for cooling the superconducting magnets in a Magnetic Resonance Imaging (MRI) machine in a hospital. In this case a particular transceiver, having a unique serial number, receiving signals from a liquid-level sensor, would have to be associated with one particular MRI machine. The liquid level could then be remotely monitored and a replenishing supply could be shipped to the hospital once the level went below a predetermined value.

Another embodiment, not to be construed as limiting, would be the monitoring of shipping containers 13. Such containers 13 are used to transport goods by being attached to various marine or land transportation modes, such as ships, barges, over-the-road chassis, and rail cars.

It is to be understood that the descriptions and embodiments described above are exemplary, and are not to be taken as limiting the scope of the invention. Alternatives, modifications, and variations, which do not depart from the spirit and scope of this invention, will be apparent to those skilled in the art. The scope of this invention is to be defined by the following claims.

The invention claimed is:

1. A method for establishing an association between an asset and an electronic device monitoring said asset, the method comprising the steps of:
   transmitting a set of information comprising information unique to said asset to a remote database via said electronic device and a first communication channel;
   said electronic device automatically transmitting a signature, unique to said electronic device, to said remote database;
   automatically searching said remote database to match said set of information to corresponding information contained in said database; and
   (a) if said set of information is successfully matched to corresponding information in said database, establishing an association between said asset and said electronic device in said remote database, and communicating successful association to a user, or
   (b) if said set of information is not successfully matched to corresponding information in said database, communicating unsuccessful association to a user.

2. The method of claim 1, wherein said set of information comprising information unique to said asset is automatically transmitted to said database.

3. The method of claim 1, wherein a single user establishes a second communication channel between said electronic device and a portable device and enters into said portable device said set of information comprising information unique to said asset.

4. The method of claim 3, wherein said communicating successful or unsuccessful association comprises conveying a text message via said electronic device and said second communication channel, to said portable device.

5. The method of claim 3, wherein said second communication channel comprises a wire or cable.

6. The method of claim 3, wherein said second communication channel is a wireless communication channel.

7. The method of claim 3, wherein at least one item of said set of information is entered by choosing items from a menu shown on a display on said portable device.

8. The method of claim 3, wherein said set of information comprises information entered by typing on a keyboard on said portable device.

9. The method of claim 8, wherein said keyboard comprises physical keys.

10. The method of claim 8, wherein said keyboard comprises virtual keys appearing on a display on said portable device.

11. The method of claim 3, further comprising the automatic performing of diagnostic tests on said electronic device and said portable device, and communicating the results of said tests to said user.

12. The method of claim 1, wherein said communicating successful or unsuccessful association comprises the displaying of a text message.

13. The method of claim 12, wherein said displaying of a text message comprises the use of text messaging on a cellular telephone.

14. The method of claim 1, wherein said set of information further comprises: information unique to said user and information unique to a customer.

15. The method of claim 14 wherein said set of information comprises the company installing said electronic device at said asset, the name of said user implementing the association of said asset, and a set of alphanumeric characters unique to the customer.

16. The method of claim 1, wherein said electronic device comprises a transceiver.

17. The method of claim 16, wherein said electronic device further comprises at least one sensor, said at least one sensor recording information unique to said asset.

18. The method of claim 17, further comprising executing at least one diagnostic test on said at least one sensor, and displaying the results of said at least one test to said user as a text message.

19. The method of claim 17, wherein said at least one sensor comprises a Global Positioning System (GPS) device, said GPS device transmitting the location of said electronic device to said transceiver.

20. The method of claim 19, wherein said asset comprises a shipping container.

21. The method of claim 19, wherein said asset comprises a mobile or stationary trailer.

22. The method of claim 21, wherein said information unique to said asset comprises information uniquely identifying a tractor hooked to said trailer.

23. The method of claim 1, wherein said set of information comprises at least one asset identification number.

24. The method of claim 1, wherein said first communication channel comprises communication satellites.

25. A method for establishing an association between an asset and an electronic device attached to said asset, said electronic device comprising a Global Positioning System (GPS) device, and a satellite transceiver, said transceiver being in satellite-assisted communication with a remote database, said remote database containing information about said asset and said electronic device,
the method capable of being implemented by one user through a handheld device, said handheld device comprising a manual input,
the method comprising:
   entering into said handheld device a first set of information comprising a company name and a user name;
   connecting a communication cable between said handheld device and said transceiver;
   initiating diagnostic testing on said electronic device;
   entering a second set of information into said handheld device, said second set of information comprising: a set of alphanumeric characters unique to said user, and information unique to said asset;
   transmitting said first and second sets of information via said transceiver to said remote database;
   said electronic device automatically transmitting a third set of information to said database, comprising: a serial number unique to said electronic device, and the location of said electronic device as determined by said GPS device;

automatically comparing said second and third sets of information to information in said remote database to find matching information; and
  (a) if said second and third sets of information are successfully matched to corresponding information in said database, automatically establishing an association between said asset and said electronic device in said remote database, and communicating successful association to said user; or
  (b) if said second and third sets of information are not successfully matched to corresponding information in said database, communicating unsuccessful association to said user.

26. The method of claim 25, wherein multiple associations of assets and electronic devices can be performed in sequence without manually re-entering at least one of said company name, said user name, and said set of alphanumeric characters.

27. The method of claim 25, wherein said asset comprises a mobile or stationary trailer.

28. The method of claim 27, wherein said information unique to said asset comprises a trailer number and a full or partial Vehicle Identification Number.

29. The method of claim 25, wherein said asset is a shipping container.

30. The method of claim 25, wherein said communicating successful or unsuccessful association to said user comprises the displaying of a text message.

31. The method of claim 30, wherein said displaying of a text message comprises conveying said message to said handheld device via said electronic device and said communication cable.

32. The method of claim 30 wherein said displaying of a text message comprises the use of text messaging on a cellular telephone.

33. The method of claim 25, wherein at least a portion of said second set of information is automatically entered into said handheld device.

34. The method of claim 25, wherein said electronic device further comprises at least one sensor, the output of said at least one sensor being transmitted to said remote database.

35. The method of claim 25, wherein said company name and said user name are entered manually.

* * * * *